3,052,042
RADAR SIMULATION PLATE AND FABRICATING
PROCESS THEREFOR
Allen M. Feder, Kenmore, N.Y.
(736 Westbrook Drive, North Tonawanda, N.Y.)
No Drawing. Filed Feb. 26, 1958, Ser. No. 717,790
3 Claims. (Cl. 35—10.4)
(Granted under Title 35, U.S. Code (1952), sec. 266)

The invention described herein may be manufactured and used by or for the Government of the United States of America for governmental purposes without the payment of any royalties thereon or therefor.

This invention relates to an improved method for constructing energy-reflecting plates which provide a realistic counterpart of a radar picture when employed as terrain models in conjunction with optical or ultrasonic radar training equipment.

The invention will be described with reference to an embodiment applicable to one important field of use, namely, aircraft-search-radar simulation equipment for training radar operators. However, the invention is not to be considered as limited to this particular embodiment or specific application.

One type of aircraft search-radar simulation equipment in use today employs a crystal ultrasonic radiator mounted on a carriage in simulation of a radar antenna mounted in an aircraft. Movements of the aircraft are simulated by moving the carriage above a base plate which is designed to represent a specific geographic area, such as the port of New York city. The base plate reflects the impinging ultrasonic energy in such manner that it presents a picture upon the viewing screen or scope of a receiving device corresponding to the picture that would be presented upon the scope of the aircraft radar if the aircraft actually flew the same course over the specific area.

A common method of making radar-return simulation plates involves photographic processing to render certain portions of a copper plate acid-resistant. The remaining portions are then cut away by means of chemical action or, at times, by hand. The desired, acid-resistant portions of copper are now hand-punched, the number of burrs (punches) per unit area constituting an important factor in the strength of the radar return (signal return) from that area. These copper return areas must be individually fixed on a base plate, care being taken to position them carefully in correspondence with the respective map areas which they represent. This can be done by placing the copper return areas upon a Plexiglas sheet which is covered by an acrylic spray, the sheet being positioned over a map of the desired area. Heat is applied to the copper return areas, thereby melting the acrylic spray and causing the copper to adhere to the Plexiglas.

The hand cutting and hand punching involved in this method does not permit precise detail to be reproduced and leads to inaccuracy of return-picture simulation as well as to non-uniformity between different plates representing the same geographical area.

The present invention avoids the tedious hand cutting and punching and the cementing of returns required in the existing method of making radar-return simulation plates. Elimination of the human element results in greater accuracy, finer detail, uniformity of results and a saving of time in the production of the plates. Very close scale relationships can be maintained in simulating the relative proportions of man-made structures, such as bridges and oil tanks. The process can be visually checked for accuracy at every stage, since it can be stopped at any point and recommenced. In addition, the target return areas can easily be altered after the plate has been completed.

The objects and advantages of the present invention are accomplished by electroplating or etching the metallic surface of a base plate according to a preselected pattern which contains the proper radar power information arranged in positionally correct relationship for simulating the radar returns from a selected geographical area.

The radar power information is first incorporated in a photographic transparency and then transferred by the photographic exposure to a light-sensitive emulsion coated upon the surface of the base plate. Light passing through the transparent (non-return) areas of the transparency affects the emulsion so that it is hardened by the process of development, whereas the emulsion beneath the opaque portions of the return areas remains soft and is easily washed away, leaving the metal plate surface exposed. The electroplating or etching is then performed by standard means and methods in which desired reflection qualities are obtained by varying the etching or plating factors.

An object of this invention is to provide an improved method for fabricating radar-return simulation plates.

Another object is to minimize manual steps, such as hand cutting and punching operations, in the fabrication of radar-return simulation plates, thus permitting more precise reproduction of minute detail and therefore greater fidelity of correspondence between the radar return simulation and the actual radar return obtained from the area being simulated.

A further object is to reduce the time required to fabricate radar-return simulation plates by minimizing the number of manual steps which are involved, such as hand cutting and punching operations.

Still another object is to provide an improved method for fabricating radar-return simulation plates in which the process is arrestable at any desired step and recommenceable at any preceding stage, so that visual inspection is always possible.

Yet another object is to provide an improved method for fabricating radar-return simulation plates upon which the target return areas can easily be altered after fabrication of the plates has been completed.

Other objects and many of the attendant advantages of this invention will be readily appreciated as the same becomes better understood by reference to the following detailed description when considered in connection with the accompanying drawings wherein:

A radar-return simulation plate is composed of a plurality of reflectors which correspond to the various radar-energy reflecting structures or objects found in the geographical area represented by the plate. Each reflector is a compound surface, certain facets of which are naturally oriented to reflect energy from a radiating source. The reflectors may be formed by etching or by plating, the etched reflector having a compound crystalline-like surface and the plated reflector having a botryoidal surface. Each type of reflector is adaptable to both optical and ultrasonic radar training devices. The shape and orientation of the reflectors determines the percentage of energy that will be returned to the energy receiver in any radar trainer system.

Different levels of radar return from the simulation plate are achieved by varying the shape and density per unit area of the reflectors. For high level radar return representation (No. 1 and No. 2 returns) these reflectors are oriented in the same relationship to each other as are the majority of structures being simulated. Proper orientation is important if realistic variation in return intensity is to result as approach headings are altered. The individual reflectors are so designed that the amount of energy reflected into the trainer system varies with the relative position of the energy source (the ultrasonic crystal which simulates the radar antenna, for example).

The process described below for fabricating a radar-return simulation plate may be divided into four broad steps, namely:

(a) Preparation of a positive transparency containing radar-return information for the desired area;

(b) Preparation of a base plate for the imprintation of an energy-reflection pattern;

(c) Photographic formation of the energy-reflection pattern on the base plate surface; and (d) Shaping of the surface of the base plate.

A. *Preparation of the Positive Transparency*

Before making the simulation plate, radar-return information must be set up on a transparent base. The base may be a sheet of acetate material, for example, and the information may be transferred to the sheet by inking or by affixing paper patterns formed of dots, lines and/or geometric figures. The line and dot areas are positionally arranged to be equivalent to energy-reflecting structures and objects and to the terrain features in the geographical area to which the simulation plate corresponds. The line and dot patterns are designed to provide properly shaped and oriented energy returns having the correct relative power levels. For example, ground clutter is depicted by randomly inking dots on the base with a very fine pen point and any opaque ink (e.g., India ink). Oil or gas tanks may be added to the base by making small opaque circles (one for each tank) with a No. 4 or No. 5 Leroy lettering pen.

The completed information plot, which is a graphic representation containing the radar-return information in accordance with which the simulation plate will later be shaped, is then photographically reduced to the desired scale of the simulation plate. The photographic reduction of the original plot results in a positive transparency and should be planned so that the emulsion side of the positive transparency is on the surface that will be in contact with the light-sensitive surface of the plate during the subsequent exposure step. This will provide the sharpest possible image definition.

The process of preparing a basic information plot can be hastened by making several component plots which together form one basic plot. Thus, several persons can prepare separate plots, each indicating a different energy-return level. When positioned in correct registry above one another, the several plots can be photographed together to provide a complete basic plot. Or, the basic plot can be subdivided geographically, several persons preparing different geographical component plots containing all return levels. When juxtaposed in correct registry, the component plots form a basic plot ready for photographic reduction to a positive transparency.

B. *Preparation of the Base Plate for Imprintation*

The base plate is prepared for the reception of a photographic image by the application of a coating of a light-sensitive material, such as photo-resist enamel. This material, when exposed to light and developed according to instructions, forms a tough, chemically resistant coating of enamel. However, if not exposed to light, the material remains soft and can be washed away with water even after passing through the development process. (Hereafter in this application the specific time and temperature values which are suggested for the use of photo-resist enamel, developer and dye apply to the commercially available Kodak products. However, other preparations may be employed if desired.)

Photo-resist enamels, developers and dyes are well known in the printing and lithographing arts. For an exposition of the chemical compositions of these materials, see the following U.S. patents: Minsk et al., 2,690,966; Minsk et al., 2,670,286; Murray et al., 2,739,892; Robertson et al., 2,732,301; and Smith et al., 2,691,584.

The coating is dried by whirling until the material has set and is then heated by applying infra-red heat until the enamel has reached a temperature of 125–150 degrees F. (approximately 5–10 minutes) after which it is allowed to cool.

C. *Formation of Energy-Reflection Pattern*

The radar-return information carried by the positive transparency is now photographically imprinted upon the light-sensitive coating of the base plate.

This is accomplished by placing the plate with its sensitized surface up, on a vacuum or pressure frame platform and setting the transparency with its emulsion side down, upon the plate coating. Precautions should be taken to insure that the emulsion side of the transparency directly contacts the light-sensitive coating, since light will reflect in any space between the two and interfere with or ruin the exposure.

If a vacuum or pressure frame is unavailable, adhesive tape can be employed to attach the positive transparency to the base plate surface.

The light-sensitive coating is then exposed to light which is directed upon it through the transparency. Since the particular type of coating described herein, the photo-resist enamel, is especially sensitive to light in the ultra-violet spectrum, the light used is preferably generated by an ultra-violet source, although sunlight or fluorescent lamps may be employed. A typical exposure time is 2½ minutes for an ultraviolet source generating the equivalent of 30 amperes at 36 inches distance.

After exposure, the transparency is removed and the plate is placed in a developing solution, such as photo-resist developer, which is suitable for photographic development of the particular type of light-sensitive material which has been described herein as the base plate coating. The plate should be placed face up in at least one-half inch of developer solution for at least two minutes, if the Kodak developer is used. The solution will wash away the portions of coating which have not been exposed to light.

After allowing the plate to drain, the quality of the plate can be visually checked by applying a dye, such as photo-resist dye, to all portions of the plate by tilting and rolling the plate on the finger tips after initial application of the dye, or by direct immersion of the plate in the dye solution. The dye is then flushed away. In the dyeing process, the plate coating acquires a coloration which permits it to be checked visually.

Undesirable breaks in the coating can now be masked by applying more of the coating material thereto with a brush, re-exposing and re-developing.

The coating material is now baked by placing the plate on a commercial heater, or under infra-red light, until it reaches a temperature of about 250–400 degrees F. The temperature should be raised gradually to avoid cracking the enamel. Satisfactory results have been achieved even where the temperature could not be raised above 150 degrees F.

After baking has been completed, undesirable breaks in the enamel can be masked by touching them up with a filling material such as acetone or lacquer.

The plate is finished by spraying the back and edges with an acrylic spray, such as Krylon, or by brushing or spraying with acetone or lacquer; these materials will not be affected by the etching or electroplating solutions in which the plate will later be immersed. Any material which has overlapped upon an area to be etched or plated must be scraped away. Care should be observed so that the surface of the plate material is not broken, since this accelerates the etching or plating process in that area and results in a distorted reflector.

D. *Shaping of the Surface of the Plate*

The surface of the plate may be shaped by either the etching or the electroplating process.

(1) If the etching process is to be utilized, the base plate is preferably fabricated from a metal such as aluminum sheet. A thickness of about 0.1 inch has been found satisfactory.

The etching solution may be any suitable etching material for the type of metal composing the plate, such as a ferric chloride solution for aluminum. The coated base plate should be placed in approximately a one-inch depth of the solution. The solution should be kept circulating so as to wash the products of the etching action out of the etch patterns and permit fresh solution to contact the bare metal at all times.

The extent of the etching may be inspected at any time by removing the plate, neutralizing the etching solution (with an ammonia solution in the case of the ferric chloride etching solution), and rinsing away the resulting precipitate. Areas of greatest etch shape density should be used as criteria for stopping the etch action, since these areas always create a heat reaction in the metal that accelerates etching within the areas.

Upon the attainment of a satisfactory etch plate, the plate should be quickly neutralized by soaking in neutralizing solution. Satisfactory results have been attained by a two-minute application of the ferric chloride solution and at least a 30-second application of ammonia solution.

The etching and neutralizing steps result in a black ferrous precipitate which should be flushed from the plate with water.

The etched aluminum surface is covered at this point with a dull oxide coating which can be brightened and protected against atmospheric oxidation by placing the plate in a heated sulfuric dichromate solution for three minutes, approximately. The plate is then neutralized in ammonia solution and flushed with water.

The finished etched plate can be modified and special effects can be added, if desired, by painting and grinding. Thus, where insufficient etching takes place, impressions can be etched into the finished plate on a small scale by local application of ferric chloride with a pen, paint brush, medicine dropper, or the like. The etched area requires neutralizing and brightening as before.

Glossy black paint or lacquer can be used to cover undesired impressions in the plate surface. Larger impressions may require filling with clay, plaster or putty before painting.

If the surface of unetched areas, which are employed to simulate non-return areas such as bodies of water, is marred or scratched, glossy black paint may be applied. The smooth, even, finish of these materials reflects energy away from the simulated antenna system, thus producing little video signal.

The "cardinal" effect (the effect produced in a display by a group of reflectors aligned parallel to each other along a sweep line of the scanning radar) may be obtained by grinding or filing striations in the finished plate at right angles to the pattern trend. Cardinal reflectors may be produced by tapping the plate surface with a spinning grinding wheel held as parallel to the plate as possible in order to produce straight scratches only.

(2) If the electroplating process is to be utilized, the base plate may be a sheet of metal such as copper, or a metal-coated sheet of plastic such as a silver-coated sheet of Plexiglas.

If a metal plate is utilized, the plate is prepared by cleaning it with a grease solvent such as carbon tetrachloride or methylene chloride. The copper surface is roughened slightly by applying an abrasive material such as pumice and gently rubbing with a soft cloth. The pumice can then be removed by washing.

The photographic exposure and development is performed as stated above in the description of the etching process. The plate is now suspended in an electroplating tank and electroplated by any suitable electroplating process. For example, the electrolyte may be a solution of a water-soluble nickel salt and the cathode may be made of nickel.

The plate may be removed from the electroplating solution when the most prominent reflectors on the plate surface extend about 1/64 inch above the surface of the plate. The plate may be tested in an ultrasonic radar training device or by exposure to a single source of energy in order to determine whether the reflectors are prominent enough. Additional plating will increase the size of individual reflectors, but too large a deposition of nickel will diffuse the reflections from the plate. The finished plate can be modified and special effects can be added, if desired, by the steps described in connection with the etched plate.

If the silver-coated sheet of Plexiglas is utilized, the electrolyte may be a solution of water-soluble copper salt and the cathode may be made of copper. The Plexiglas may be coated with silver by any suitable means such as spraying the surface with a silver solution contained in a spray gun.

After coating the Plexiglas with silver, the photographic exposure and development processes are performed as previously described. The plate is then electroplated and finished as described in connection with the copper base plate.

The processes described above mark a distinct advance in the production of radar-return simulation plates, some of the advantages over presently employed manufacturing techniques being:

(1) Elimination of much of the manual operations required by the present standard plate-making procedures. The difficulty of attaining accurate return perimeters by hand and chemical cutting methods and the tedious cementing of returns to plate material is eliminated.

(2) Selection of features to be included in the radar simulator can now be made without regard to human limitations. For example, small details and even entire small returns that could not formerly be reproduced can now be etched or electroplated with great accuracy.

(3) Very close scale relationships can be maintained (for instance, in simulating relative proportions of bridges and oil tanks).

(4) A visual check for accuracy can be made at any manufacturing stage.

(5) If necessary, each step can be halted at any point prior to etching or plating and recommenced at any preceding stage.

(6) The target areas on each simulation plate can be altered after manufacture as follows:

(*a*) New data can be added to plates by repeating the steps of the process using a new transparency. Undesirable reflections can be eliminated easily by filling in, painting over, or both.

(*b*) Terrain contour levels can be represented by succeeding layers of plating, as can components of larger human constructions.

(7) The transparent positive lends itself to transmission by wirephoto. The elimination of human error factors and the advantage of wirephoto transmission permit rapid, accurate, and uniform fabrication of plates at remote stations, surpassing all known techniques in this feature.

Obviously many modifications and variations of the present invention are possible in the light of the above teachings. It is therefore to be understood that within the scope of the appended claims the invention may be practiced otherwise than as specifically described. For example, the techniques are equally applicable for simulating returns from infrared emanations and other active and passive microwave targets.

I claim:
1. A process for forming a metallic surface in accordance with a predetermined configuration which will reflect to an energy-radiating source the same pattern of energy which would be returned to an energy-radiating antenna by a preselected geographical area comprising the steps of preparing a graphic representation containing graphic information representative of the desired configuration by providing properly shaped and oriented energy returns having the correct relative power levels; preparing a photographic transparency from said graphic representation; coating a metallic surface with an adherent coating of light-sensitive material; placing said transparency in contact with said coating; exposing said coating to light which passes through said transparency; developing said coating of light-sensitive material and washing away the unexposed portions, whereby the coated and uncoated portions of the metallic surface present a pattern conforming to a plan view of the original graphic representation; hardening said light-sensitive coating; shaping the uncoated portions of the metallic surface to provide reflection of impinging energy and immersing the metallic surface in a heated dichromate sulphuric solution to brighten the surface.

2. A process as set forth in claim 1, wherein the shaping of the uncoated portions of the metallic surface is accomplished by etching.

3. A process as set forth in claim 1, wherein the shaping of the uncoated portions of the metallic surface is accomplished by electroplating.

References Cited in the file of this patent
UNITED STATES PATENTS

| | | |
|---|---|---|
| 1,768,729 | Amstutz | July 1, 1930 |
| 2,257,143 | Wood | Sept. 30, 1941 |
| 2,309,752 | Cooke | Feb. 2, 1943 |
| 2,600,343 | Tuttle | June 10, 1952 |
| 2,670,285 | Minsk et al. | Feb. 23, 1954 |
| 2,690,966 | Minsk et al. | Oct. 5, 1954 |

OTHER REFERENCES

Clerc: "Ilford Manual of Process Work," 3rd edition, Ilford Ltd., London, 1941, pp. 208–211.

"Steel," vol. 141, No. 21, pp. 153–156.